United States Patent [19]

Loewenthal

[11] 4,219,112

[45] Aug. 26, 1980

[54] CONVEYOR SYSTEM WITH ARTICLE TRANSFER APPARATUS

[75] Inventor: Horst Loewenthal, Tiengen, Fed. Rep. of Germany

[73] Assignee: SIG - Schweizerische Industrie - Gesellschaft, Neuhausen am Rheinfall, Switzerland

[21] Appl. No.: 938,490

[22] Filed: Aug. 31, 1978

[30] Foreign Application Priority Data

Aug. 31, 1977 [CH] Switzerland .................... 10632/77

[51] Int. Cl.³ ............................................. B65G 47/26
[52] U.S. Cl. ................................... 198/449; 198/433; 198/457; 198/487; 198/740
[58] Field of Search .............. 198/487, 488, 485, 433, 198/448, 449, 459, 451, 461, 740

[56] References Cited

U.S. PATENT DOCUMENTS

| 2,363,920 | 11/1944 | Young et al. | 198/487 |
| 3,140,771 | 7/1964 | Harrison et al. | 198/575 X |
| 3,572,495 | 3/1971 | Luginbuhl | 198/461 |
| 4,067,434 | 1/1978 | Mumford | 198/740 X |

Primary Examiner—Jeffrey V. Nase
Attorney, Agent, or Firm—Spencer & Kaye

[57] ABSTRACT

A conveyor system for advancing groups of edgewise positioned flat articles includes a first conveyor having an outlet end; a second conveyor disposed at the outlet end of the first conveyor and being oriented transversely thereto; and a transfer apparatus including a transfer pusher for sequentially moving the article groups from the outlet end of the first conveyor onto the second conveyor; and an article group accelerator engaging and accelerating the article groups on the second conveyor along the conveying direction thereof prior to engagement and conveyance of the respective article groups by carriers of the second conveyor.

10 Claims, 3 Drawing Figures

CONVEYOR SYSTEM WITH ARTICLE TRANSFER APPARATUS

BACKGROUND OF THE INVENTION

This invention relates to a transfer apparatus for moving groups of edgewise positioned flat articles from a first chain conveyor onto a second chain conveyor which is arranged transversely to the first chain conveyor. The apparatus has a transfer pusher to sequentially advance the article groups from the end of the first chain conveyor to the carriers of the second chain conveyor. Such transfer apparatuses are used, for example, in conveyor systems for feeding crackers or cookies to packaging machines which wrap the articles in groups.

Known apparatuses of the above-outlined type have the disadvantage that their output cannot be increased beyond 120 groups/minute, because beyond such an output the fragile flat articles (for example, cookies) are crushed by the carriers of the second chain conveyor. These carriers arrive with full speed into engagement with the article group that had been previously positioned by the transfer pusher into the path of the carriers of the second conveyor.

SUMMARY OF THE INVENTION

It is an object of the invention to provide an improved article transfer apparatus from which the above-discussed disadvantage is eliminated.

This object and others to become apparent as the specification progresses, are accomplished by the invention, according to which, briefly stated, the conveyor system for advancing groups of edgewise positioned flat articles includes a first conveyor having an outlet end; a second conveyor disposed at the outlet end of the first conveyor and being oriented transversely thereto; and a transfer apparatus including a transfer pusher for sequentially moving the article groups from the outlet end of the first conveyor onto the second conveyor; and an article group accelerator engaging and accelerating the article groups on the second conveyor along the conveying direction thereof prior to engagement and conveyance of the respective article groups by carriers of the second conveyor.

With an apparatus structured in the above-defined manner, output levels of 150 groups/minute and more can be achieved.

DETAILED DESCRIPTION OF THE PREFERRED EMBODIMENT

Figure 1:
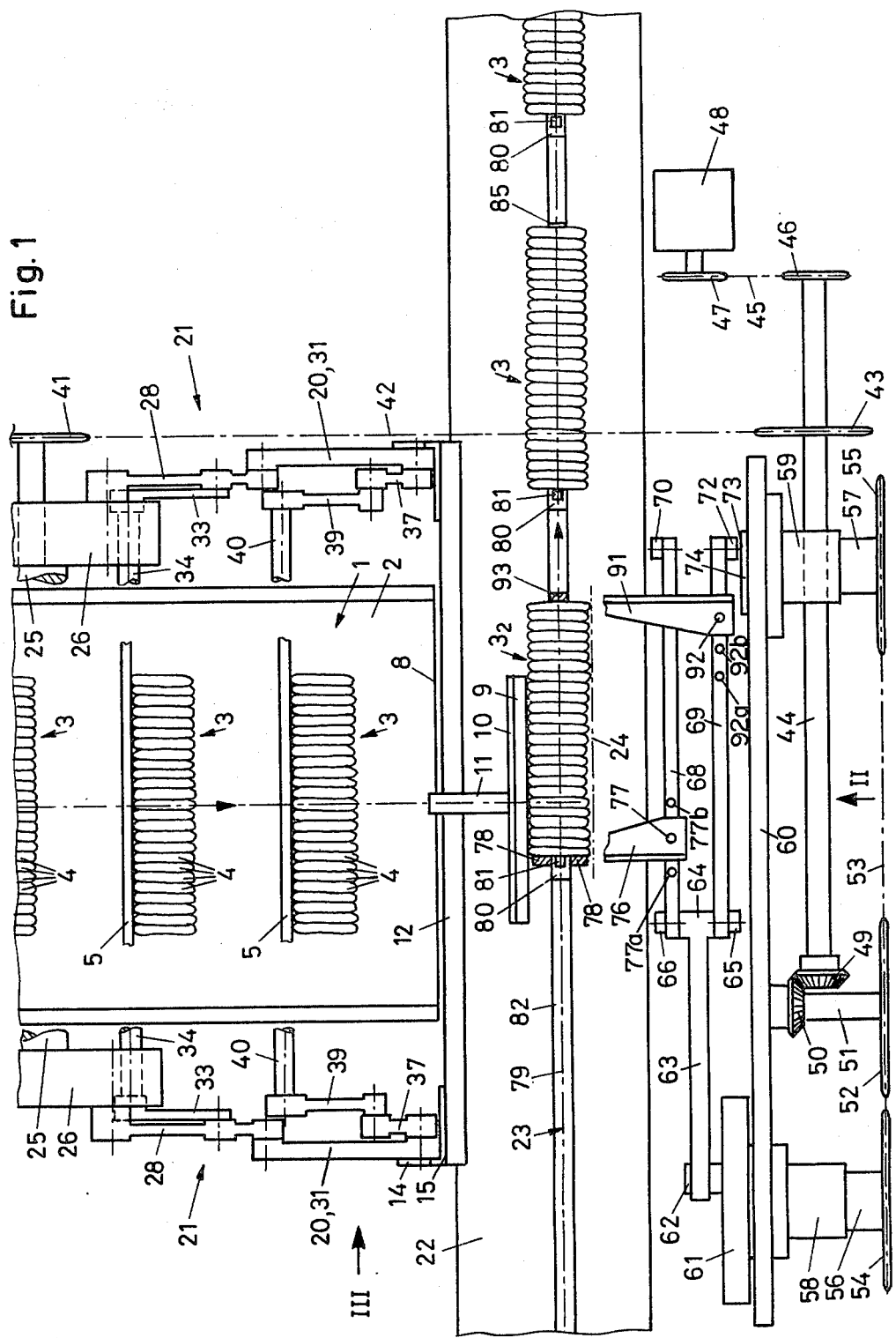
FIG. 1 is a schematic plan view of a preferred embodiment of the invention.

Turning now to the Figures, the conveyor system includes a first chain conveyor 1 having a horizontal feed track 2 for advancing groups 3 of upright (edgewise) positioned flat items (such as crackers or cookies) 4 which are advanced by rod-like carriers 5 of the chain conveyor 1. The opposite ends of each carrier 5 are secured to parallel endless chains 6 (symbolically illustrated in FIG. 3) which are trained about sprockets 7 (only one shown) and additional sprockets (not shown). As a carrier $5_1$ is moved downwardly with the chains 6 about sprockets 7 at the end of the track 2, the article group $3_1$ is further advanced by a pusher bar 9 which is mounted on the lower end of a plate 10. The components 9 and 10 form a pusher hereafter designated as the "transfer pusher." The transfer pusher 9, 10 is connected by means of an angle member 11 and an angled support beam 12 as well as two brackets 13 with two crank mechanisms 211 which are arranged in a symmetrical manner on either side of the feed track 2 and which will be described in detail later. Each bracket 13 is formed of a vertical plate 15 and a web 14. The support beam 12 is rigidly connected at its ends with the respective plate 15. The angle member 11 is connected by bolts 16 and 17 in an adjustable manner with the support beam 12 and the pusher plate 10, respectively. Slots 18 and 19 are provided in the angle member 11 and the support beam 12, respectively, to provide for an adjustment of the pusher plate 10 in a horizontal and vertical direction to adapt the apparatus to the particular shape of the articles to be handled.

It is the purpose of the crank mechanisms 21 to guide the support beam 12 and thus the transfer pusher 9, 10 parallel to itself periodically in a closed path. For the pusher 9 this path is shown as a dash-dotted closed curve a which lies in a vertical longitudinal plane of the feed track 2 and which has an elongated oval configuration. The traveling path a is so dimensioned that the transfer pusher 9, 10 in each instance takes over the groups 3 presented by the carriers 5 and pushes them further until they reach a feed track 22 which extends transversely to the feed track 2 and forms part of a second chain conveyor 23. In its outermost position $9_1$ the transfer pusher 9, 10 introduces the article group $3_2$ into the chain conveyor 23. A further motion of the group $3_2$ by virtue of its moment of inertia is limited, for example, by an abutment wall which may be formed of spring elements and which is illustrated in the drawing only symbolically by a broken line 24.

The two crank mechanisms 21 are driven by two crank discs 26 keyed to a common shaft 25. An eccentric crank pin 27 of each crank disc 26 is articulated to respective triangular coupling members 28. In the zone of its two corners remote from the eccentric pin 27, the triangular coupling member 28 is articulated at 29 and at 30 to two identical, straight coupling links 20 and 31, respectively. The support beam 12 is rigidly affixed at its ends to the respective coupling link 20 via the respective bracket 13. Further, to the triangular coupling member 28 there is articulated, at 32, the upper end of a rocker 33, the lower end of which is, in turn, articulated to a pivot 34 fixedly secured to the machine frame. The other ends of the coupling links 20 and 31 are articulated at 35 and 36, respectively, to a triangular coupling member 37 to which, at 38, there is articulated the upper end of a rocker 39 which has the same configuration as the rocker 33. The lower end of the rocker 39 is articulated to a pivot 40 which is fixedly secured to the machine frame. The triangle formed by the articulations 35, 36 and 38 is congruent with that formed by the articulations 29, 30 and 32. It is seen that as the crank disc 26 rotates, the rockers 33 and 39 are oscillated together back and forth while they guide the coupling links 20 and 31 parallel to one another. The two coupling links 20 of the two crank mechanisms 21 thus execute such a motion that the transfer pusher 9, 10 as noted before, travels in the closed path a.

Figure 2:
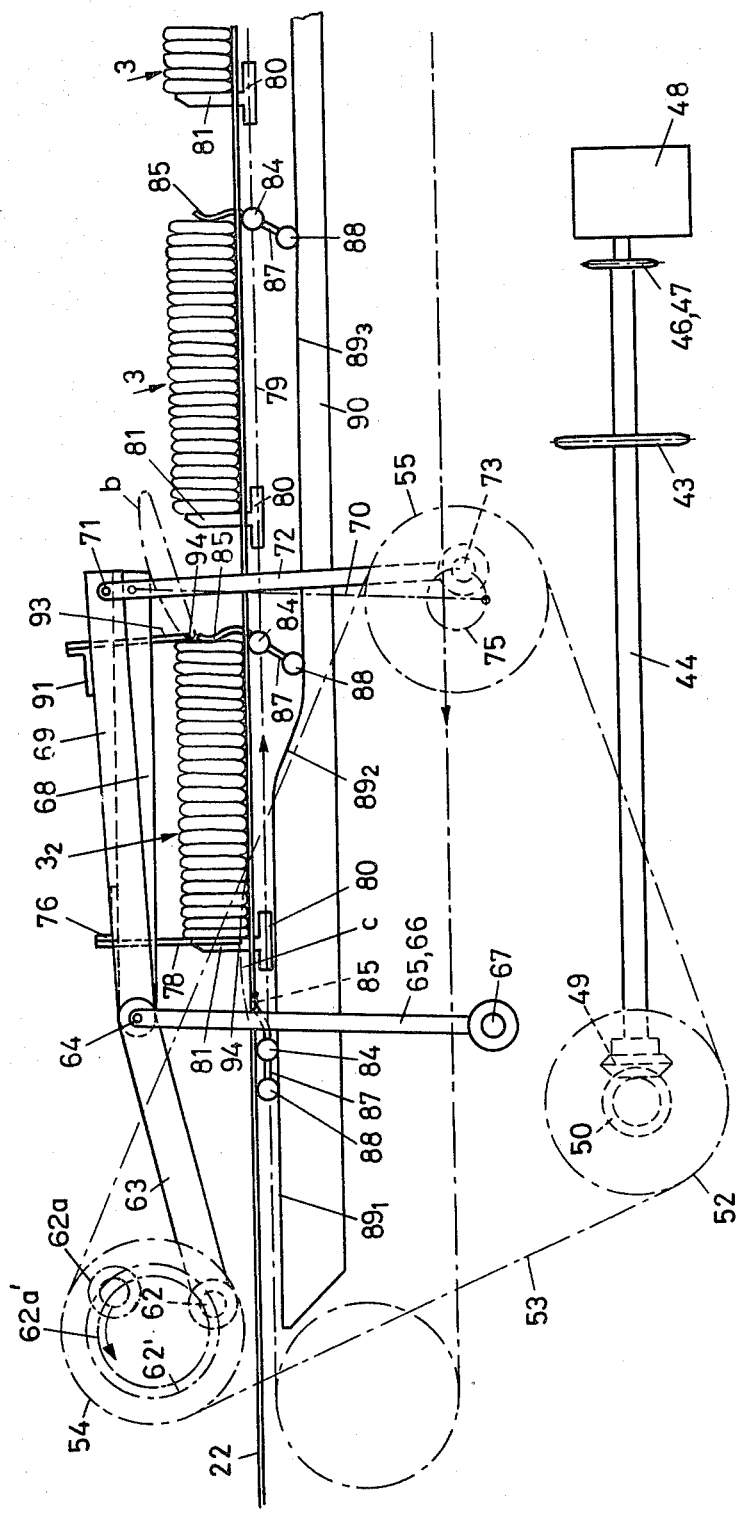
FIG. 2 is a schematic elevational view of the same embodiment as seen in the direction of the arrow II of FIG. 1.

Referring now in particular to FIGS. 1 and 2, the crank discs 26 are driven together by means of a sprocket 41 which is mounted on an extension of the shaft 25 and which is coupled to a sprocket 43 by means of a chain 42. The sprocket 43 is mounted on an intermediate shaft 44 which is driven by a motor 48 by means of a chain 45 and sprockets 46 and 47. The intermediate shaft 44 which is supported on the machine frame, carries a bevel gear 49 meshing with a bevel gear 50 which, in turn, drives a sprocket 52 by means of a shaft 51 on which the gear 50 and the sprocket 52 are mounted. The sprocket 52 is, in turn, coupled with two sprockets 54 and 55 by means of a chain 53. The sprockets 54 and 55 are mounted on respective shafts 56 and 57, the bearings 58 and 59 of which are secured to a machine frame part 60.

On the shaft 56 there is mounted a crank disc 61, the eccentric crank pin 62 of which is radially adjustable so that the radius of eccentricity, that is, the radius of its circular traveling path 62' can be slightly varied. Thus, for example, the crank pin 62 may be radially inwardly adjusted—by any conventional means—to a position 62a to thus travel along a circular path 62a' of shorter radius. A coupling link 63 is articulated at one end to the crank pin 62 and at its other end, at 64, is jointed to the upper end of two identical rockers 65 and 66, the lower ends of which are, in turn, articulated to a pivot 67 secured to the machine frame. Further, the coupling link 63 is also articulated at 64 to the left-hand terminus of two coupling links 68 and 69. The right-hand terminus of the coupling link 68 is articulated to the upper end of a rocker 70, whose configuration is identical to that of the rocker 66. For the sake of clarity, the rocker 70 is shown in FIg. 2 only by its dash-dotted center line. The coupling link 69 is, at its right-hand terminus, articulated, at 71, to the upper end of a rocker 72, the lower end of which is articulated to an eccentric crank pin 73 secured to a crank disc 74 which, in turn, is mounted on an extension of the shaft 57. Since the crank pin 73 moves in a circular path 75 which lies in a vertical plane, the coupling link 69 periodically changes its orientation contrary to the coupling link 68 which retains its horizontal orientation. Because of the back-and-forth movement of the rockers 66 and 70, all the points of the link 68 move on circular arcs, the radius of which is identical to the length of the rockers 66, 70.

Figure 3:
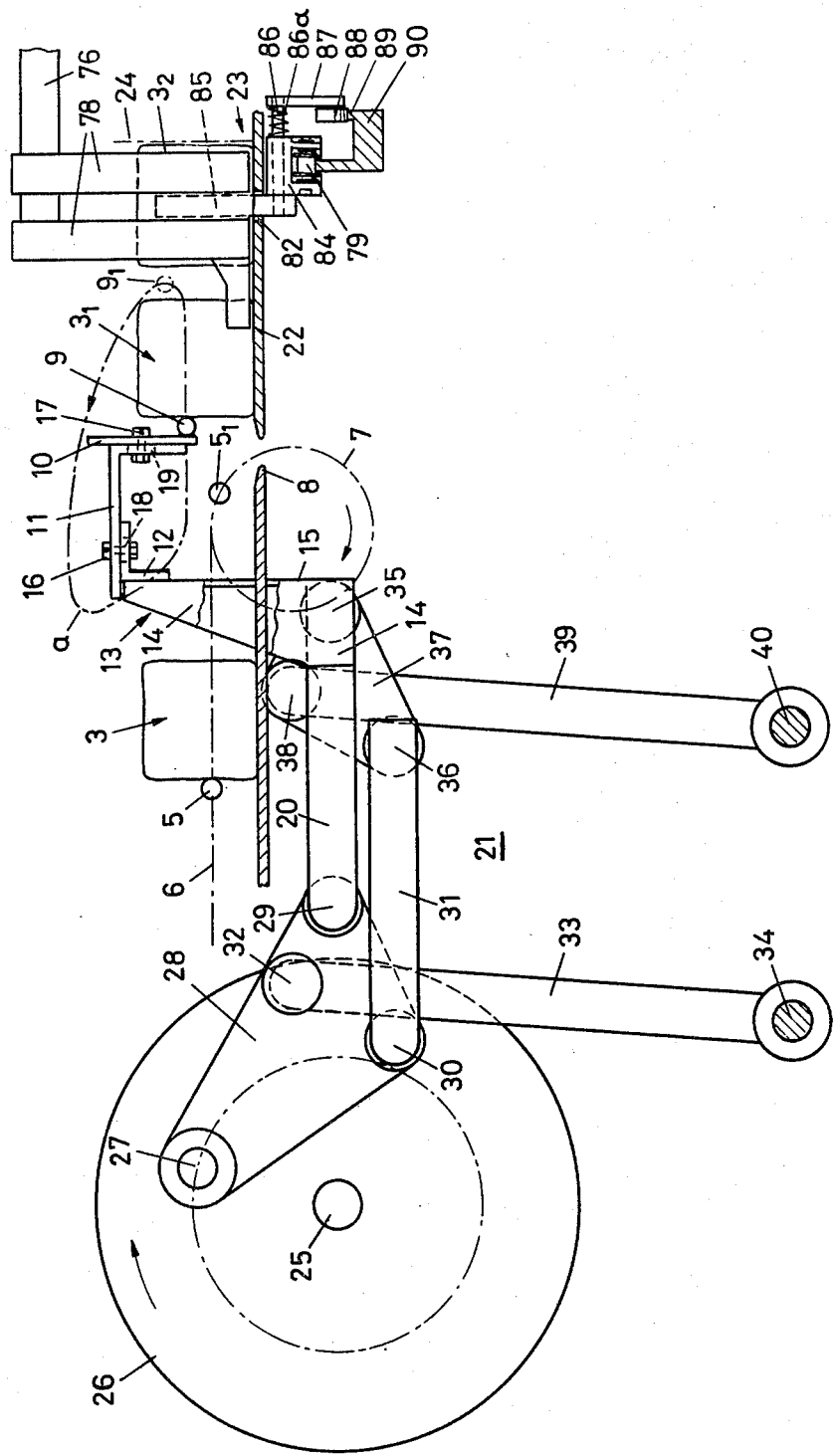
FIG. 3 is a schematic elevational view of the same embodiment as seen in the direction of arrow III of FIG. 1.

Also referring once more to FIG. 3, on the coupling link 68 there is adjustably mounted, for example, by means of set screws 77, an accelerating pusher 76 provided, at its free end, with two downwardly projecting fingers 78 which, upon transfer of a group $3_2$ to the chain conveyor 23, accelerate this group in the direction of conveyance on the feed track 22. The adjustability of the accelerating pusher 76 is indicated at 77a and 77b which are further possible exemplary locations for the setscrews 77. The chain conveyor 23 comprises an endless chain 79 to which there are attached at regular intervals carriers 80 (of which only three are shown in FIGS. 1 and 2). Each carrier 80 has a finger 81 which projects through a slot 82 provided in the feed track 22 in order to further advance the group 3. The chain 79 is provided with holders 84 for pivotal counter holders 85 adapted to engage the leading article of the article group 3. Each counter holder 85 is, as seen in FIG. 3, secured to a shaft 86 which is supported in the respective holder 84 and which carries an arm 87 which, in turn, is provided at its free end with a follower roller 88. A torque-exerting spring 86a secured to the holder 84 seeks to swing the arm 87 so that the follower roller 88 remains in continuous contact with a cam track 89 of a longitudinal beam 90 which is attached to the machine frame and which also supports the upper flight of the endless chain 79. At the beginning portion $89_1$ of the cam track 89, the arm 87 is maintained by the follower roller 88 in a horizontal position so that the counter holder 85 is situated underneath the track 22. At the subsequent inclined portion $89_2$ of the cam track 89, the follower roller 88 is lowered, whereby the counter holder 85 gradually assumes an upright position projecting through the slot 82. In the adjoining portion $89_3$ of the cam track 89 the counter holder 85 is in a fully upright position for preventing the leading article of the respective group 3 from toppling during further conveyance. It is to be understood that the chain 79 of the second conveyor 23 is also driven by the motor 48 in synchronism with the crank discs 26, 61 and 74. Such an arrangement is not shown for the sake of clarity.

An additional upper holder 91 prevents a toppling of the foremost (leading) article of a group $3_2$ during transfer by the transfer pusher 9, 10 at a time when this group has not yet been advanced towards the right into a position as shown in FIGS. 1 and 3. The upper holder 91 is adjustably mounted, for example, by means of one or more set screws 92, on the coupling link 69 and has, at its free end, a downwardly projecting finger 93. The adjustability of the upper holder 91 is indicated at 92a and 92b which are further possible exemplary locations for the setscrews 92. The lower terminus 94 of the finger 93 describes, during the motion of the coupling link 69, a closed curve b which has a flat elliptical shape inclined to the horizontal. As a transfer of an article group $3_2$ begins, the terminus 94 of the finger 93 is at the rear, left-hand reversal point of the curve b. After the counter holder 85 has assumed its upright position, the finger terminus 94 moves towards the right and upwardly to clear the traveling path of the group $3_2$, thus ensuring that it does not obstruct the further travel of the group $3_2$.

Each point of the finger 78 of the accelerating pusher 76 describes a circular arc (designated at c for the terminal point 94), the radius of which is equal to the effective length of the rockers 66 and 70. The back-and-forth motion along the circular arc c has, at the terminal points of the arc, a zero velocity, while at approximately the middle of the arc, the velocity is the greatest. The motions of the transfer pusher 9, 10 along the curve a and the motions of the accelerating pusher 76 along the circular arc c as well as the motion of the carriers 80 of the chain 79 are coordinated with one another in such a manner that the finger 78 of the accelerating pusher 76 arrives into engagement with the group $3_2$ ahead of the finger 81 of the carrier 80, at a moment in which this group has not yet been propelled up to the abutment wall 24 by the transfer pusher 9, 10. Since the velocity of the accelerating finger 78 again decreases towards the right-hand end of the circular arc c, the carrier finger 81 overtakes the group $3_2$ and from that point on assumes conveyance thereof. The last (trailing) article of the group $3_2$ thus first receives a slight push by the initially slow-moving fingers 78 and then is accelerated by a gentle pressure exerted by the fingers 78 and eventually receives a slight push by the finger 81 which, however, corresponds only to the velocity difference between the finger 81 and the group $3_2$, already moving along the track 22. These impacts are clearly much weaker than the impact with which the carrier finger 81, traveling at full speed, would contact an article group which is at rest at the abutment wall 24, as it has been the case in transfer apparatuses used heretofore. In practice, the invention makes possible an increase of the transfer output from a maximum approximately 120 groups/minute to more than 150 groups/minute without damaging fragile articles of flat configuration.

It is a further advantage of the above-described transfer apparatus that there is ensured a very secure guidance of the support beam 12, on which the transfer pusher 9, 10 is mounted, by means of two symmetrically arranged crank mechanisms 21. Heretofore, an element which corresponded to the support beam 12 was driven only from one side by means of contour cams which, as a rule, do not operate as precisely and without vibration as linkage mechanisms.

It is a further advantage of the invention that the transfer pusher 9, 10, the accelerating pusher 76 and other elements of the apparatus can be adjusted in a simple manner so that changes in the dimensions of the groups 3 and their components 4 can be taken into account without difficulty.

It is to be understood that the above description of the present invention is susceptible to various modifications, changes and adaptations, and the same are intended to be comprehended within the meaning and range of equivalents of the appended claims.

What is claimed is:

1. In a conveyor system for advancing groups of edgewise positioned flat articles, including a first conveyor having an outlet end; a second conveyor disposed at the outlet end of the first conveyor and being oriented transversely thereto; a transfer apparatus including a transfer pusher for sequentially moving the article groups from the outlet end of the first conveyor onto the second conveyor; and carriers forming part of the second conveyor and arranged for sequentially engaging and advancing the article groups subsequent to their arrival on the second conveyor; the improvement comprising an article group accelerating means including an accelerating pusher for engaging and accelerating the article groups on said second conveyor along the conveying direction thereof prior to engagement and conveyance of the respective article groups by said carriers of said second conveyor.

2. A conveyor system as defined in claim 1, wherein said transfer pusher has an outermost advanced position which it reaches with the article group being transferred; the improvement further comprising means coordinating the motion of said transfer pusher with the motion of said accelerating pusher for effecting engagement of the transferred article group by said accelerating pusher before said transfer pusher reaches said outermost advanced position.

3. A conveyor system as defined in claim 1, wherein said accelerating pusher is arranged to engage a trailing end of each article group; further comprising an upper holder for engaging a leading end of each article group during its displacement by said transfer pusher; a counter holder associated with each carrier of said second conveyor for engaging a leading end of each article group during engagement of the article group, at a trailing end thereof, by the respective carrier; first driving means for moving each carrier and the associated counter holder in said conveying direction; means for shifting the respective counter holder into contact with the leading end of the article group substantially upon completion of the displacement of the article group on said second conveyor by said accelerating pusher; and second driving means for moving said upper holder in a closed path having a vertical plane extending parallel to the conveying direction of said second conveyor; said first and second driving means being synchronized for coordinating the motion of said upper holder with the motion of the respective counter holder for maintaining the upper holder in engagement with the leading end of the respective article group at least until the counter holder arrives into contact with the last-named leading end and for subsequently moving the upper holder out of the traveling path of the article group.

4. A conveyor system as defined in claim 3, wherein said second driving means forms part of said article group accelerating means and comprises
    (a) an eccentric drive having a radius of eccentricity;
    (b) a first coupling link operatively connected to the eccentric drive for reciprocation in a direction generally parallel to the conveying direction of the second conveyor; said accelerating pusher being mounted on said first coupling link; and
    (c) a second coupling link operatively connected to the eccentric drive for reciprocation in a direction generally parallel to the conveying direction of the second conveyor; said upper holder being mounted on said second coupling link.

5. A conveyor system as defined in claim 4, further comprising first and second rockers of identical length each having one end articulated to said first coupling link at spaced locations thereof and another end articulated for pivotal motion about a stationary axis.

6. A conveyor system as defined in claim 4, further comprising a first rocker having a first end articulated to said second coupling link and a second end articulated for pivotal motion about a stationary axis; a second rocker having first and second ends; said first end of said second rocker being articulated to said second coupling link; a pivotal support mounted on said second end of said second rocker; and means comprised in said second driving means for driving said pivotal support in a circular path synchronously with said eccentric drive.

7. A conveyor system as defined in claim 6, wherein said radius of eccentricity is adjustable and further comprising means for adjusting said accelerating pusher with respect to said first coupling link and means for adjusting said upper holder with respect to said second coupling link.

8. A conveyor system as defined in claim 1, wherein said accelerating pusher has two spaced fingers arranged to engage each article group at locations on either side of the location of engagement by the respective carrier of said second conveyor.

9. A conveyor system as defined in claim 1, wherein said transfer apparatus comprises two synchronous cranking mechanisms arranged on both sides of said first conveyor; a support beam arranged above said first conveyor transversely to the conveying direction thereof and being attached, at respective ends, to said two cranking mechanisms; and means for adjustably mounting said transfer pusher to said support beam.

10. A conveyor system as defined in claim 9, wherein each cranking mechanism has a crank drive including an eccentric pin traveling in a circular path; a first coupling member having a first, second, third and fourth articulation; said first coupling member being jointed to said pin at said first articulation; a second coupling member spaced from said first coupling member and having a fifth, sixth and seventh articulation, said second coupling member carrying one end of said support beam; first and second rockers of identical length, having first ends jointed, respectively, to said second and fifth articulations and having second ends supported for pivotal motion about a stationary axis; a first coupling link jointed at its ends to said third and sixth articulations, respectively, and being rigidly connected to an end of said support beam; and a second coupling link jointed at its ends to said fourth and seventh articulations, respectively; said first and second coupling links being parallel-spaced; said second, third and fourth articulations of said first coupling member and said fifth, sixth and seventh articulations of said second coupling member forming the corners of two congruent triangles.

* * * * *